US012344466B2

(12) United States Patent
Castro Soares Junqueira

(10) Patent No.: US 12,344,466 B2
(45) Date of Patent: Jul. 1, 2025

(54) UNDERGROUND WASTE COLLECTION SYSTEM

(71) Applicant: SOTKON SP SLU, Guipuscoa (ES)

(72) Inventor: Fernando Manuel Castro Soares Junqueira, Oporto (PT)

(73) Assignee: SOTKON SP SLU, Guipuscoa (ES)

( * ) Notice: Subject to any disclaimer, the term of this patent is extended or adjusted under 35 U.S.C. 154(b) by 24 days.

(21) Appl. No.: 17/928,331

(22) PCT Filed: Jun. 9, 2020

(86) PCT No.: PCT/IB2020/055415

§ 371 (c)(1),
(2) Date: Nov. 29, 2022

(87) PCT Pub. No.: WO2021/250442

PCT Pub. Date: Dec. 16, 2021

(65) Prior Publication Data

US 2023/0136266 A1 May 4, 2023

(51) Int. Cl.
*B65F 1/14* (2006.01)
*B65F 1/16* (2006.01)

(52) U.S. Cl.
CPC .......... *B65F 1/1447* (2013.01); *B65F 1/1623* (2013.01)

(58) Field of Classification Search
CPC ............................. B65F 1/1447; B65F 1/1623
USPC ................. 220/484, 811, 812, 813, 827, 832
See application file for complete search history.

(56) References Cited

U.S. PATENT DOCUMENTS

| | | | | |
|---|---|---|---|---|
| 5,992,680 A * | 11/1999 | Smith | B65F 1/1646 | 220/812 |
| 7,475,515 B2 * | 1/2009 | Machledt | H02G 9/10 | 220/500 |
| 2011/0210124 A1 * | 9/2011 | Da Silva | B65F 1/1447 | 220/484 |
| 2011/0309651 A1 * | 12/2011 | Hernandez | B60J 7/1621 | 296/100.08 |
| 2021/0122567 A1 * | 4/2021 | Aydin | B65F 1/1615 | |

FOREIGN PATENT DOCUMENTS

| | | | | | |
|---|---|---|---|---|---|
| CN | 201573928 | U | * | 9/2010 | B65F 1/1447 |
| CN | 105668092 | A | * | 6/2016 | |
| CN | 113682685 | A | * | 11/2021 | |
| DE | 202010010784 | U1 | | 11/2011 | |
| EP | 893368 | A1 | * | 1/1999 | B65F 1/10 |
| ES | 21378826 | A1 | | 12/1999 | |
| WO | WO-0196767 | A2 | * | 12/2001 | B65D 90/66 |
| WO | 2010041969 | A1 | | 4/2010 | |
| WO | 2020087030 | A1 | | 4/2020 | |

* cited by examiner

*Primary Examiner* — Orlando E Aviles
*Assistant Examiner* — Niki M Eloshway
(74) *Attorney, Agent, or Firm* — Rivka Friedman

(57) ABSTRACT

This invention relates to an underground waste collection system, which has a pedestrian platform that also functions as the lid (1) of a tank (3) into which a container (4) can be inserted and wherein the waste is deposited through a deposition top bin (2), which is external and attacked to the lid (1). The lid opens by means of gas cylinders (7) and, in order that the impact of the opening limit of the lid (1) is as small as possible and does not cause damage to the gas cylinders (7), the lid (1) comprises two brackets, perpendicularly to its axis of rotation, which connect to gas cylinders (7), and wherein at least one of them is a sliding bracket (6).

1 Claim, 6 Drawing Sheets

UNDERGROUND WASTE COLLECTION SYSTEM

TECHNICAL FIELD OF THE INVENTION

This invention falls within the scope of underground waste collection systems, more specifically related to a solid waste collection system for urban environment, comprising a lid that serves as a pedestrian platform and, externally to the same, the deposition top bins.

STATE OF THE ART OF THE INVENTION

The state of the art which is the closest to this invention concerns the patent document EP2344403, wherein a system for waste collection is disclosed, comprising a pedestrian platform that also functions as the lid of a tank into which a container is inserted and wherein the waste is deposited through a deposition top bin. The lid is opened by means of gas cylinders/springs which make the process very simple and balance the weight of the lid, in addition to allowing it to be manually opened/closed by a single operator. The opening angle of the lid is set to close to 90° and is imposed by the upper limit of travel of the gas springs. The problem associated to this system is that the opening of the lid has a strong impact at the end of its opening movement, which can cause damage to the gas springs and to the whole mechanical structure of the collection system.

Technical Problems Solved

This invention solves the problem concerning the impact created at the end of the lid (1) opening, by placing at least one sliding bracket (6) on the inside of the lid (1), which allows the lid to be rotated (1) until it is fully opened. The aim of this invention is to protect against the impact of the lid (1) at the end of its opening as a result of the inertia of rotational movement of the lid (1). The said impact presents high potential to cause damage to the gas cylinders/springs (7) and to the entire mechanical structure of the collection system, an issue which is thus eliminated through this device.

At the same time, the use of at least one sliding bracket (6) allows using less force upon manually closing of the lid (1), making this operation incomparably easier.

DESCRIPTION OF THE INVENTION

Figure 1:
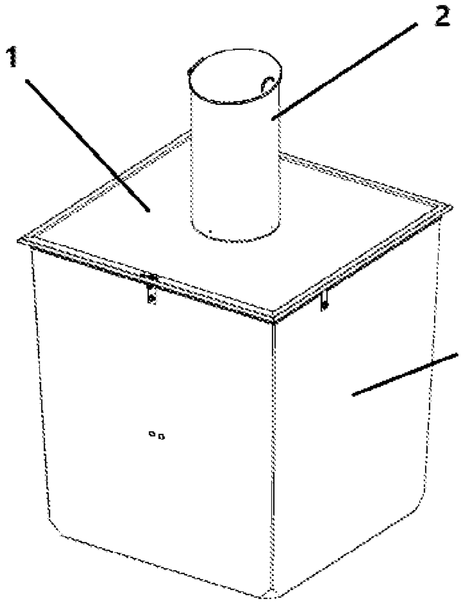
FIGS. 1 and 2—representation and sectional view of a waste collection system with a (1), which serves as a pedestrian platform, of a tank (3), the said lid (1) provided with a deposition top bin (2) for placing waste.
Figure 2:
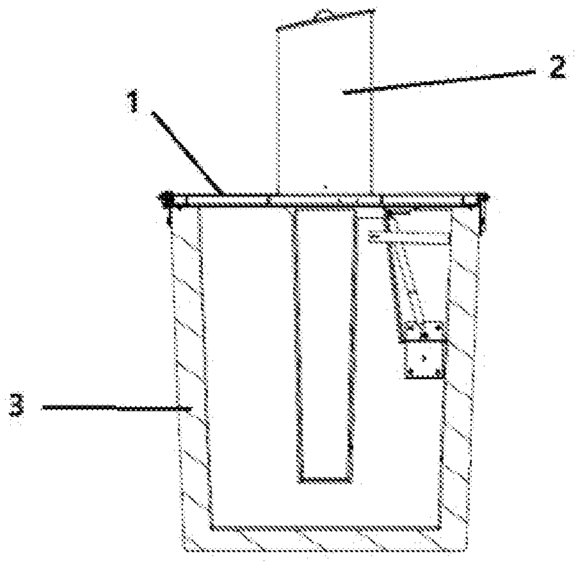
Figure 3:
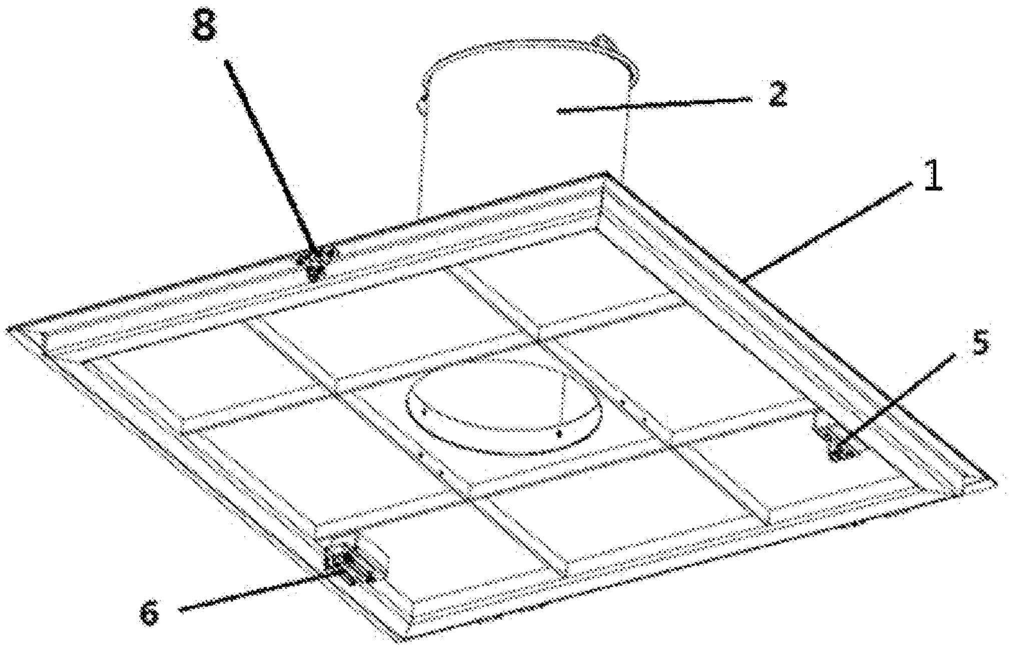
FIG. 3—representation of the inner surface of the lid (1), i.e. internally to the tank (3) and where both brackets that help opening the lid (1) can be observed: the common bracket (5) and the sliding bracket (6). Also illustrated in this figure is the latch (8) of the lid (1).
Figure 4:
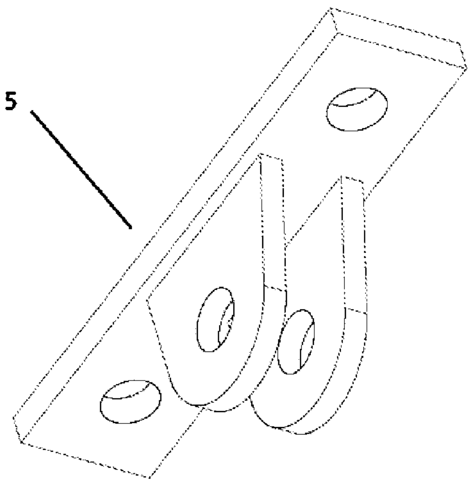
FIG. 4—isolated representation of the common bracket (5).
Figure 5:
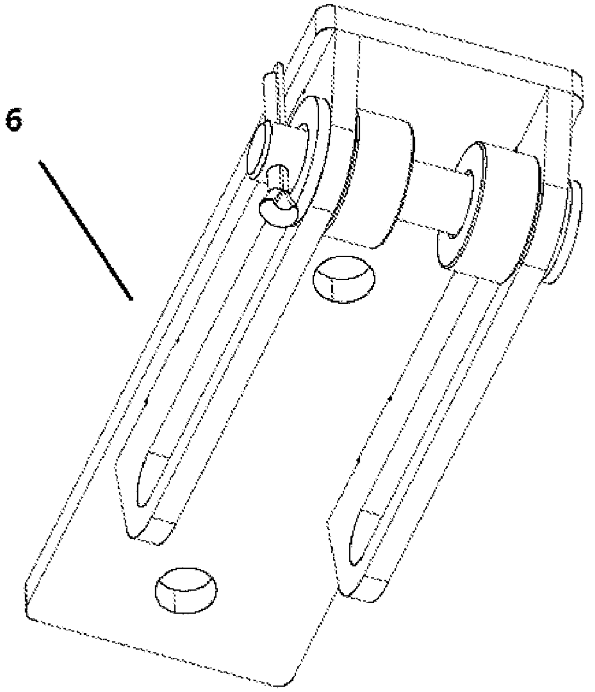
FIG. 5—isolated representation of the sliding bracket (6), where a pin or a key can be observed, which serves to prevent the axis from tending to one side and disassembling.
Figure 6:
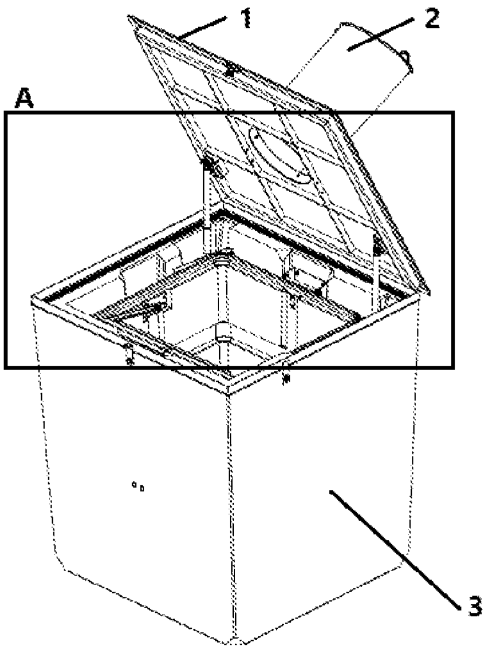
FIG. 6—representation of the waste collection system, with a detail view of the components in the area defined by A.
Figure 7:
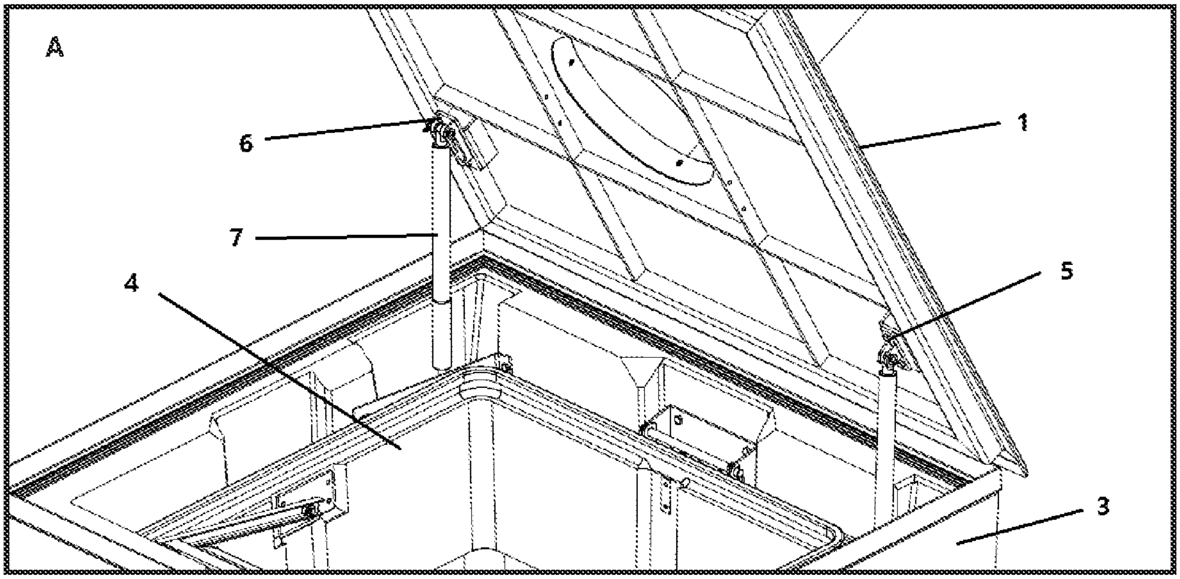
FIG. 7—detail representation of the area A of FIG. 6, wherein a lid (1) is identified, with a common bracket (5) provided for the movement of one of the gas cylinders (7) and with a sliding bracket (6) provided for the other gas cylinder (7). Also illustrated is the container (4), which is inserted into the tank (3).
Figure 8:
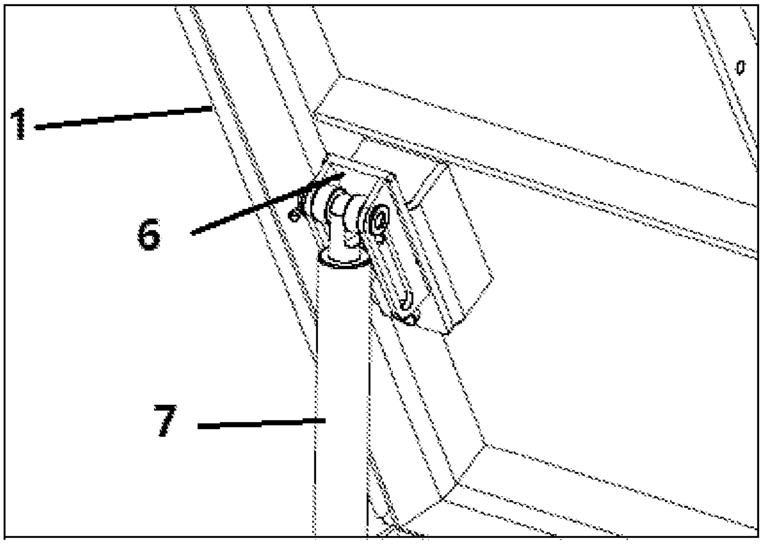
FIGS. 8 and 9—detailed representation of the sliding bracket (6) attached to the lid (1) and hooked up to a gas cylinder (7).
Figure 9:
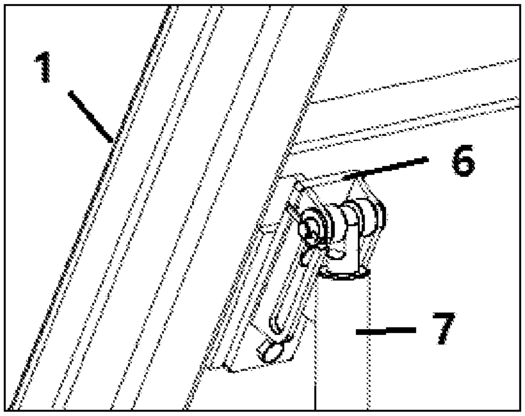
Figure 10:
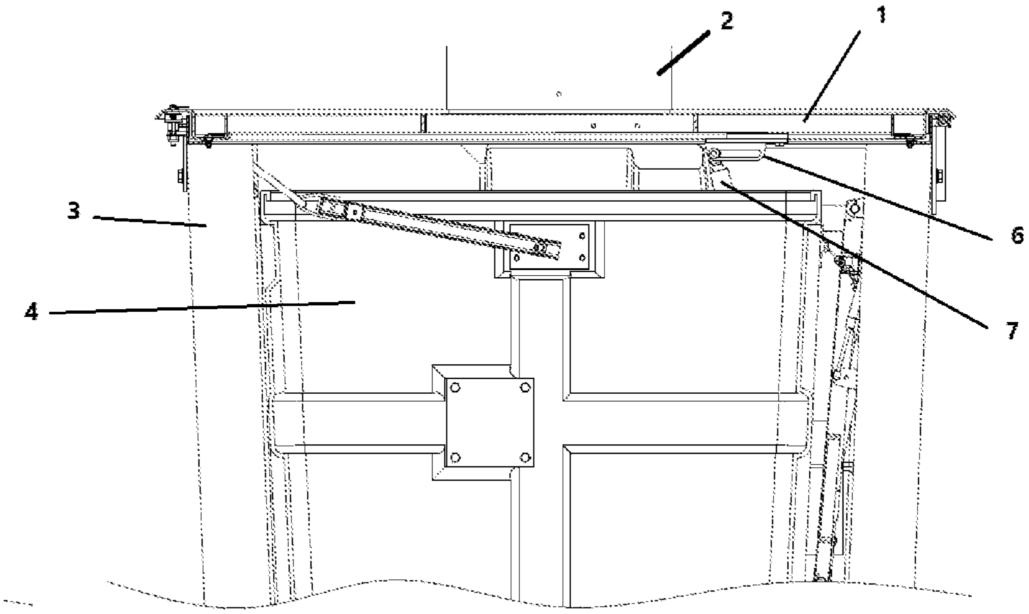
FIG. 10—representation of the system with the lid (1) in the closing position, where the sliding bracket (6) is at rest and the container (4) is inside the tank (3).
Figure 11:
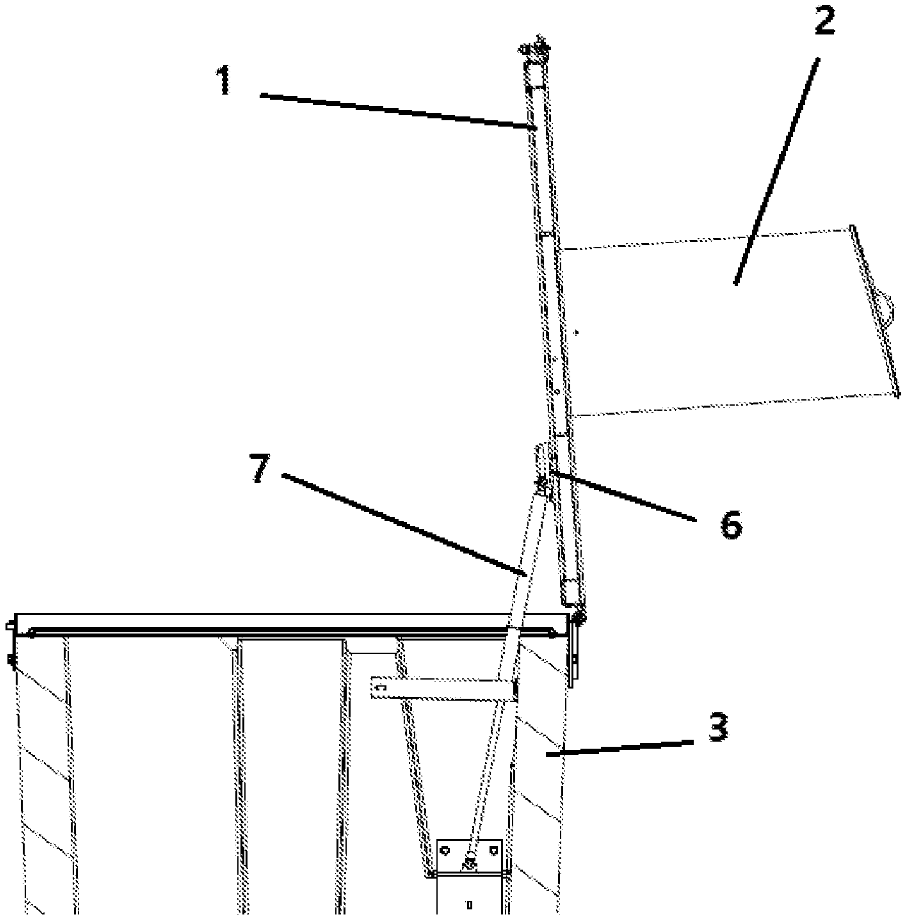
FIG. 11—representation of the collection system with the lid (1) in the opening position, where the sliding bracket (6) is positioned at its end limit of travel, so that it is possible to remove the container with the empty tank (3).

This invention relates to a waste collection system with a pedestrian platform which also functions as the lid (1) of a tank (3) into which a container (4) can be inserted and wherein the waste is deposited through a deposition top bin (2), which is external and attached to the lid (1). This deposition top bin (2) also has a lid, and it is through this deposition top bin (2) that the waste is discharged to the container (4), since the lid (1) comprises an opening suitable for that purpose.

The lid is opened by means of gas cylinders/springs, which make the opening process simple and balance the weight of the lid, in addition to allowing it to be manually opened/closed by a single operator.

In order that the impact of the opening limit of the lid (1) is as small as possible, given the inertia of the collection system, and does not cause damage to the gas cylinders (7), the lid (1) comprises two brackets (5) (6) perpendicularly to the axis of rotation of the lid (1), which are connected to gas cylinders (7) and wherein at least one of the brackets (5) (6) is a sliding bracket (6), promoting an opening angle of the lid that is approximately 90° relative to the ground and which is imposed by the upper limit of travel of the gas cylinders (7).

When the lid (1) is in the closed position, the gas springs (7) are compressed and the lid (1) is locked in the latch (8). When the lid (1) is in the open position, the latch (8) is unlocked by the operator and, with a simple, slight manual aid, the lid (1) opens until the gas spring connected to the sliding bracket (6) reaches its end limit of travel.

For this to be possible, the brackets (5) (6) must not only be perpendicular to the axis of rotation of the lid (1), but must also be parallel to each other, with the extensions of the gas cylinders (7) being unlevelled during opening by imposition of the brackets (5) (6).

When the gas cylinder (7) connected to the sliding bracket (6) reaches its limit of travel, the lid (1) is not fully opened. However, the sliding bracket (6) allows it to continue to open, counting on the opposite gas cylinder (7) connected to the common bracket (5).

The fact that the lid is prevented from reaching its maximum opening with only one movement has a damping effect and provides mechanical protection.

As soon as the lid (1) is positioned in the opening position, but not in its maximum, a second slight help from the operator is enough to cause the lid to reach its maximum opening, which is close to an angle of 90° relative to the ground. At this stage, both the gas springs have performed their entire travel, being levelled and preventing the lid (1) from opening beyond the pre-set angle. Finally, after discharging the container (4), the lid (1) is closed in the reverse order of the steps listed above.

The invention claimed is:

1. Underground waste collection system, comprising a tank (3), the said tank (3) having a lid (1), and into which a container (4) can be inserted wherein the waste is deposited through a deposition top bin (2), the said deposition top bin (2) being attached to the lid (1) on the outside of the tank (3) and the said lid (1) being moved by means of gas cylinders (7), wherein the lid (1) comprises two brackets (5) (6) affixed to the lid and connected to the gas cylinders (7), one of the brackets (5) (6) being a sliding bracket (6) and these brackets (5) (6) being perpendicular to the axis of rotation of the lid (1), parallel to each other, and at maximum extensions of the cylinders, tops of the cylinders being at unlevelled heights relative to each other, wherein the lid (1) starts to open through both gas cylinders (7), connected to the sliding bracket (6) and the common bracket (5), and ends upon actuation of the gas cylinder (7) connected to the common bracket (5).

* * * * *